Patented Feb. 22, 1949

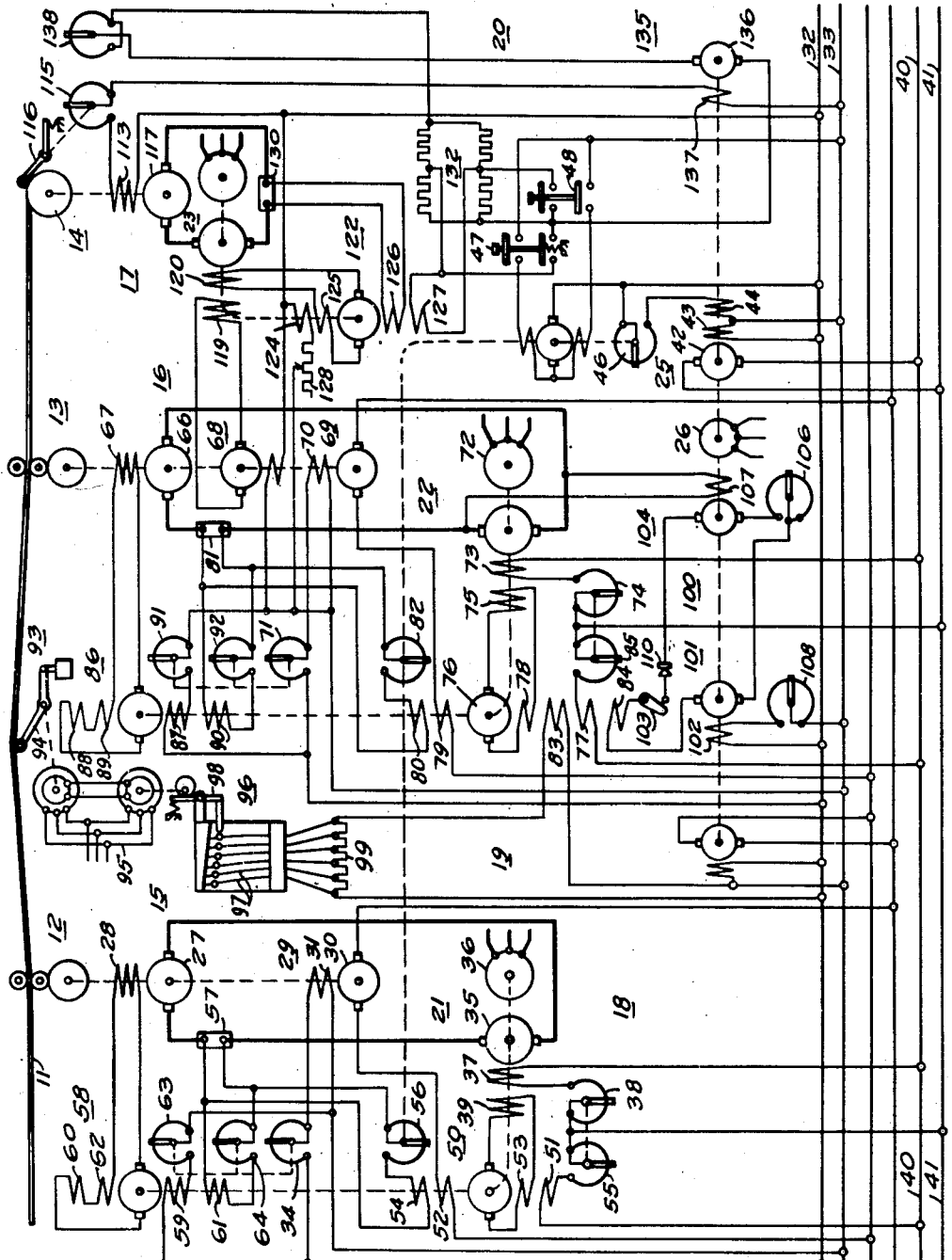

2,462,233

UNITED STATES PATENT OFFICE 2,462,233

MOTOR CONTROL SYSTEM

Glenn E. Stoltz, Pittsburgh, Pa., assignor to Westinghouse Electric Corporation, East Pittsburgh, Pa., a corporation of Pennsylvania Application June 30, 1947, Serial No. 758,195

13 Claims. (Cl. 318—7)

My invention relates, generally, to control systems, and it has reference, in particular, to control systems for a plurality of motors having a driving connection with a common load, such as may be used in tandem strip rolling mills and the like.

Generally stated, it is an object of my invention to provide an improved control system for the drive motors of tandem rolling mills, which shall be simple and inexpensive to manufacture, and which will be economical and easy to operate.

More specifically, it is an object of my invention to provide, in a tandem rolling mill or other device of a similar nature, for operating the several roll motors from individual generators, and for maintaining predetermined operating relations between the motors.

Another object of my invention is to provide for using a master control generator for collectively controlling the output voltages of a plurality of separate generators supplying electrical energy individually to a plurality of motors having a driving connection with a common load.

Yet another object of my invention is to provide, in a control system for tandem rolling mills and the like, for collectively controlling the several outputs of a plurality of separate generators supplying electrical energy individually to the roll motors, and to provide for individually regulating the output voltages of these generators in accordance with a common reference voltage, the loads on their respective motors and the speeds thereof.

It is also an object of my invention to provide, in a control system for tandem rolling mills and the like, for utilizing a separate generator for each of a plurality of roll motors, and for determining the outputs of the several generators in accordance with the voltage of a master control generator and the outputs of their separate regulating generators, which regulating generators are responsive to the voltage of the master generator and the speeds and the loads on the respective motors.

I also propose to provide for increasing the speed range of motors in a variable voltage control system which utilizes separate generators for each motor having associated regulating generators, by individually varying the excitation of the main field windings of each generator and that of the pattern field windings of its associated regulating generator, simultaneously.

A further object of my invention is to provide, in a control system for a plurality of motors, for varying the speeds of each of the motors individually, by simultaneously varying the energization of the pattern field winding of its respective regulating generator, and the energization of the field winding of its respective speed pilot generator.

It is an important object of my invention to provide, in a motor control system, for compensating for different degrees of the motor saturation by varying the energization of the speed regulating field winding of the motor regulating generator simultaneously with variations of energization of the pattern field winding thereof to change the speed of the motor.

Another important object of my invention is to provide, in a control system for tandem rolling mills, for limiting the maximum tension of the strip by varying the relationships between the roll motors of successive roll stands in different amounts as the mill is slowed down.

A yet further object of my invention is to provide for so varying the operation of a regulating generator in a reel motor control system during acceleration and deceleration, as to provide an inertia compensation characteristic which gradually decreases and then increases in accordance with the requirements of the torque characteristics of the reel drive for different diameters of the coil.

Other objects will in part be obvious, and will in part be described hereinafter.

In practicing my invention in one of its forms, the armatures of the driving motors for the several roll stands of a tandem cold mill and the delivery reel, are connected separately in variable voltage control circuits with their respective main generators. The field windings of the roll stand motors are energized from regulating generators responsive to the field currents thereof. The main generators are provided with main field windings energized from a common bus which is supplied with electrical energy from a master control generator having a motor-operated field rheostat. Regulating field windings on each of these main generators are separately energized from individual regulating generators having pattern field windings energized from the master control generator, and differential field windings energized from speed responsive pilot generators on their associated motors. Tensiometers between each of the roll stands are arranged to energize tension limiting field windings on the regulating generator of the motor of the next or succeeding roll stand so as to reduce the speed of the motor of the next stand should the tension between the stands become excessive. Buck and boost generators energized from their respective motor and generator buses and from a source of control potential are utilized for controlling the regulating generators for progressively slowing down the motors of the successive stands in greater amounts when the mill is slowed down, so as to prevent the increase in tension which normally results from slowdown of the mill. The energization of the delivery reel motor is varied during acceleration and deceleration, with the diameter of the coil on the reel, so as to produce first a drooping, and then a rising torque characteristic for matching the inertia characteristics of the reel with increasing coil diameters.

For a more complete understanding of the nature and scope of my invention, reference may be made to the following detailed description which may be studied in connection with the accompanying drawing, in which:

Figure 1 is a diagrammatic view of a control system for a tandem cold mill embodying the invention in one of its forms, and Fig. 2 shows a curve representing the torque requirements of the reel drive for different diameters of the coil.

Referring to Fig. 1, the reference numeral 10 may denote, generally, a control system for a tandem cold mill wherein a strip of metal 11 is disposed to pass through a roll stand 12, and a succeeding roll stand 13, which may be substantially representative of any number of successive roll stands, after which the strip is wound on a reel 14. The control system 10 may comprise motors 15, 16 and 17 connected in driving relation with the stands 12 and 13, and the reel 14, respectively. These motors may be provided with control means 18, 19 and 20, including separate main generators 21, 22 and 23, respectively, and a common or master control generator 25.

The motor 15 of the roll stand 12 is provided with an armature 27 and a field winding 28. A pilot generator 29 is utilized in connection with the motor 15 for producing a voltage proportional to the speed of the motor. In this instance the pilot generator comprises an armature 30 and a field winding 31. This field winding may be energized from a suitable source of electrical energy, such as the exciter bus conductors 32 and 33, through a field rheostat 34.

Electrical energy may be supplied to the armature 27 of the roll motor 15 from the main generator 21, which may have an armature 35 driven by a motor 36, and be provided with a main field winding 37 and a regulating field winding 39. The output voltage of the main generator 21 may be varied generally to vary the speed of the motor 15 by connecting the main field winding 37 in circuit relation with a rheostat 38 to a master bus comprising conductors 40 and 41, which may be energized from the master generator 25.

The master generator 25 may have an armature 42 having a driving connection with a motor 26, a biasing field winding 43, and a main field winding 44. The biasing field winding 43 may be energized from the exciter bus conductors 32 and 33, to provide a minimum output voltage so as to prevent matching zero or relatively low voltages. The output voltage of the master generator may be varied by connecting its main field winding 44 to the exciter bus conductors 32 and 33 through a motor-operated field rheostat 46, which may be controlled by means of "raise" and "lower" push button switches 47 and 48, which may be actuated for raising and lowering the output voltage of the master generator, respectively.

The output voltage of the main generator 21 may be regulated by energizing its regulating field winding 39 from a regulating generator 50 having driving connection with the motor 36, a pattern field winding 51, a differential field winding 52, a self-energizing field winding 53, and a speed regulating field winding 54.

The pattern field winding 51 may be connected to the conductors 40 and 41 of the master bus through a rheostat 55, which may be operatively connected to the field rheostat 38 of the main generator 21, in order to provide for adjusting the energization of the pattern field winding 51 of the regulating generator 50 when the rheostat 38 is operated to effect individual adjustments of the speed of the motor 15, whereby the energization of the regulating field winding is maintained relatively constant.

The differential field winding 52 may be connected in circuit relation with the armature 30 of the pilot generator 29 and a source of bias voltage such as the exciter bus conductors 32 and 33, so as to be differential with respect to the pattern field winding 51. The self-energizing field winding 53 may be connected in circuit relation with the regulating field winding 39 of the main generator 21 in such sense as to maintain the output voltage under balanced operating conditions.

The speed regulating field winding 54 may be energized in accordance with the load on the motor 15 in order to provide a compounding effect for adjusting the regulation of the motor under different load conditions. The field winding 54, may for example, be connected through a rheostat 56 to a shunt 57 connected in the armature circuit of the motor 15 so as to be energized differentially with respect to the pattern field winding 51. The rheostat 56 may be operatively connected to the field rheostat 46 of the master generator 25, so as to modify the compounding effect at low generator voltages.

The field winding 28 of the motor 15 may be energized from a motor regulating generator 58 also having driving connection with the motor 36 and provided with a plurality of field windings 59, 60, 61 and 62. The field winding 59, which may be designated the pattern field winding, may be energized from a source of substantially constant potential, such as the exciter bus conductors 32 and 33, through a pattern field rheostat 63.

The field winding 60, which may be designated the control or differential field winding, may be connected in series circuit relation with the motor field winding 28 so as to be differential with respect to the pattern field winding.

The speed regulating field winding 61 may be connected to the shunt 57 in circuit relation with a rheostat 64, so as to be cumulative with respect to the pattern field winding 59 and provide for varying the speed regulation of the main motor 15 with the load thereon.

The self-energizing field winding 62 may be connected in circuit relation with the differential field winding 60 to supply the air gap losses of the machine and maintain the output voltage under balanced operating conditions.

The rheostats 34, 63 and 64 may be operatively connected together to provide for varying the speed regulation with changes of motor speed, and for varying the excitation of the pilot generator field winding 31 with changes of motor speed as determined individually by the energization of the pattern field winding 59, so as to maintain the proper balance with the voltage of the master generator 25.

The motor 16 of the roll stand 13 may be provided with an armature 66 and a field winding 67. An auxiliary pilot generator 68 may be utilized in connection with the motor 16, and also a main pilot generator 69, which may have a field winding 70 energized from the exciter bus conductors 32 and 33 through a rheostat 71. The apparatus for the roll stand 13 may be substantially representative of that for a number of intermediate stands, with the possible exception of the auxiliary pilot generator 68 which may be used only on the last stand.

The armature 66 of motor 16 may be supplied with electrical energy from its associated main generator 22, which may be driven by a motor 72. The generator 22 may be provided with a main field winding 73 energized from the master bus conductors 40 and 41 through a field rheostat 74, and a regulating field winding 75.

The regulating field winding 75 may be energized from a regulating generator 76, corresponding to the regulating generator 58 of the motor 15, which may be driven by the motor 72. The generator 76 may be provided with a pattern field winding 77, a self-energizing field winding 78, a differential field winding 79 energized from the pilot generator 69 and a speed regulating field winding 80 energized differentially with respect to the pattern field winding 77 from a shunt 81 in the circuit of the armature 66 through a rheostat 82 coupled to the rheostats 56 and 46. In addition to these field windings a tension control field winding 83, and a taper tension field winding 84 may be provided on the regulating generator 76, the purposes of which will be explained in detail hereinafter. The energization of the pattern field winding 77 may be controlled individually by a rheostat 85 which may be coupled to the rheostat 74 as in the case of the rheostats 51 and 38 of the control means 18.

The field winding 67 of the roll motor 16 may be energized from a motor regulating generator 86 having driving connection with the motor 72, and provided with a pattern field winding 87, a differential field winding 88, a self-energizing field winding 89, and a speed regulating field winding 90.

The pattern field winding 87 may be connected to the conductors 32 and 33 through a rheostat 91. The differential field winding 88 may be connected in circuit relation with the field winding 67 to oppose the pattern field winding, and the self-energizing field winding 89 which may be connected in circuit therewith. The speed regulating field winding 90 may be connected to the shunt 81 in the armature circuit of the motor 16, in circuit with a rheostat 92, so as to be cumulative with respect to the pattern field winding 87. The rheostats 71, 91 and 92 may be coupled as were the rheostats 34, 63 and 64 of the control means 18.

In order to provide for limiting the maximum tension in the strip 11 and preventing tearing of the strips, means, such as the tensiometer device 93, may be provided between the roll stands 12 and 13. The tensiometer device 93 may comprise a bell-crank mechanism 94 which may be connected by means of a synchro-tie system 95 to regulating means 96 comprising a plurality of flexible contacting arms 97 disposed to be biased by means of an operating member 98 to progressively short circuit successive steps of a control resistor 99. The control resistor 99 may be connected in circuit relation with the tension limiting field winding 83 of the regulating generator 76 so as to reduce the voltage applied to the armature 66 of the roll motor 16 when the tension of the strip 11 increases above a predetermined value. The motor 16 will thereupon be slowed down so as to reduce the tension in the strip 11 between the stands 12 and 13. This can also be accomplished by connecting the regulating means for biasing the voltage upward of the preceding stand generator.

In order to prevent increased tension between successive stands due to the over-gauge of strip 11, which is usually obtained when the mill is slowed down, control means 100 may be provided in addition to the tensiometer device 93, or alternatively thereto, for producing taper tension by progressively varying the slowdown of successive stands to prevent increased tension. This result may be obtained either by decreasing the amount of slowdown of the preceding stands, or as shown, by increasing the slowdown of subsequent stands.

The control means 100 may comprise, for example, a bucking generator 101 for applying a bias voltage to the field winding 84 of the regulating generator 76, having a field winding 102 connected to a source of constant potential such as the exciter bus conductors 32 and 33. A switch 103 may be used to connect a booster generator 104 in series circuit relation with the bucking generator 101, a rheostat 106, which determines the degree of biasing, and the auxiliary field winding 84 of the regulating generator 76. The booster generator 104 may be provided with a field winding 107 which may be energized in accordance with the voltage applied to the armature 66 of the motor 16 by the generator 22. A rheostat 108 may be provided in circuit relation with the field winding 102 for varying the output voltage of the bucking generator so that the biasing is introduced at predetermined voltage and speed. Biasing of speed relationship between stands and relief in tension may also be obtained by relatively raising the voltage of the preceding generator or weakening the field of the motor it supplies. If desired, the booster generator 104 may be omitted and field 107 put on generator 101 to accomplish the same result.

The driving motor 17 of the reel 14 may be provided with a field winding 113 which may be energized from the exciter bus conductors 32 and 33 in accordance with the coil diameter being, for example, connected through a rheostat 115 which is operable in accordance with the diameter of the coil on the reel. The rheostat 115 may be actuated by a suitable bell-crank mechanism 116 which is responsive to the diameter of the coil on the reel 15. The armature 117 of the reel motor 17 may be energized from its separate main generator 23 having a main field winding 119 energized from the pilot generator 68, and a regulating field winding 120 which may be energized from a tension regulating generator 122.

The tension regulating generator 122 may be provided with pattern, self-energizing, control and inertia compensating field windings 124, 125, 126 and 127, respectively. The pattern field winding 124 may be energized from the exciter bus conductors 32 and 33 through a rheostat 128. The self-energizing field winding 125 may be connected in circuit relation with the regulating field winding 120 of the main generator 23. The control field winding 126 may be energized in accordance with the load on the reel motor, being, for example, connected across a shunt 130 which is in circuit relation with the armature 117.

In order to provide for more nearly compensating for the inertia of the rotating parts of the reel drive during acceleration and deceleration, the inertia compensating field winding 127 of the tension regulating generator 122 may be connected to a bridge network 132 of resistors so as to be energized either cumulatively or differentially with respect to the pattern field winding 124, depending on whether the "raise" push button switch 47 or the "lower" push button switch 48 is operated to increase or decrease the voltage applied to the master bus conductors 40 and 41.

Electrical energy may be supplied to the bridge network 132 from an inertia compensating generator 135 having an armature 136 and a field winding 137. The armature 136 may be connected across the network 132 through a control rheostat 138. The field winding 137 may be connected in series circuit relation with the field winding 113 of the reel motor and the reel motor rheostat 115.

In order to provide the drooping characteristic shown in the initial portion of the curve a in Fig. 2, the rheostat 138 may have a tapered resistance characteristic and may be operatively connected to the rheostat 115 and so arranged as to initially reduce the output of the inertia compensating generator 135 as the bell crank mechanism 116 actuates the rheostats 115 and 138 in accordance with the increase of diameter of the coil on the reel 15.

In operation, the individual main drive motors 15 and 16 will be synchronized by matching the voltages of their pilot generators 29 and 69 against the voltage of the master bus conductors 30 and 31 through the medium of their regulating generators 50 and 76, respectively. The bias voltage from the conductors 53 and 54 is used in the pilot generator circuits and on the field winding 43 of the master generator 25 to avoid matching substantially zero or relatively low voltages at zero or relatively low speeds. The output voltage of the master generator 25 will preferably have a straight line characteristic, and on account of the biasing effect of its field winding 43, will develop a predetermined voltage, such as, for example, 30 volts when the energization of its main field winding 44 is substantially zero.

Since the voltage of each main generator is dependent, both, upon the energization of its main field winding, which is energized from the master generator, and upon the energization of its regulating field winding, which is energized from its regulating generator, the output voltage of each main generator will be adjusted by its regulating generator until the speed of its main motor pilot generator is of the proper value to match its voltage with the voltage of the master generator, and thus maintain synchronization between individual main drive motors.

The normal operating range of speed adjustment of the main or roll motors may be effected generally or collectively by varying the output voltage of the master generator 25, thereby causing the speeds of the roll motors to vary until the output voltages of their respective pilot generators match the voltage of the master generator. Since the rheostats 56 and 82 of the regulating generators 50 and 76 are operatively connected to the master generator rheostat 46, the compounding effects of the speed regulating windings 54 and 80 may be modified at the lower generator voltages.

Individual speed adjustment of any of the main drive motors to vary the tension may be accomplished by adjusting the field rheostat in the energizing circuit of the pattern field winding of the motor regulating generator. For example, the speed of the motor 15 may be varied relative to that of the other motors by adjusting the pattern field rheostat 63. Since this rheostat is mechanically connected to the rheostat 34 in the field circuit of the pilot generator 29, the new motor speed may be maintained without changing the voltage on the pilot generator, since the energization of the field winding 31 is automatically compensated to produce the same output voltage at the new speed.

If more than the normal range of speed adjustment is required, additional individual adjustment may be obtained by reducing the voltages of the individual main generators. This may be accomplished by inserting resistance in the main generator field circuit and, at the same time, inserting resistance in the energizing circuit of the pattern field winding of the regulating generator for the main generator. This results in only a slight change, if any, in the generator regulating field current when the generator voltage is adjusted. For example, the roll motor 15 may be slowed down by adjusting the rheostat 38 to reduce the voltage of its main generator 21 and at the same time adjust its associated regulating generator 50 to maintain the lower voltage.

Should the tension in the strip 11 between the roll stands 12 and 13 increase above a predetermined value at any time during operation, the bell-crank 94 will be actuated to operate the operating member 96 to shunt one or more steps of resistor 99. This increases the energization of the field winding 83 of the regulating generator 76, thus reducing the energization of the regulating field winding 75 of the main generator 22. Accordingly, the voltage applied to the roll motor 16 will be reduced, so that this motor 16 slows down and limits the tension in the strip between stands 12 and 13 to a predetermined value.

When the mill is slowed down by reducing the output voltage of the master generator 25, the voltages applied by the main generators 21 and 22 to the motors 15 and 16, respectively, will be reduced accordingly. Since the output voltage of the booster generator 104 is dependent on the output voltage of the main generator 22, it will be reduced in like manner. Accordingly, at some predetermined value for which the output of the bucking generator 101 may be adjusted, the output voltage of the bucking generator 101 overcomes the opposing voltage of the booster generator 104. The field winding 84 thereby becomes energized differentially with respect to the pattern field winding 77. Accordingly, the voltage produced by the main generator 22 will be bucked down and reduced more than the voltage produced by the main generator 21. Accordingly, the motor 16 will be slowed down to a greater degree than is the motor 15, whereby increased tension between stands 12 and 13 may be readily prevented. By adjusting the rheostats 107 of the bucking generators 101 of successive stands to different positions, successive roll stands in a tandem mill may be slowed down in different or progressively greater amounts to prevent increased tension at reduced mill speeds. Such progressive slowdown or taper tension may be used between any number of successive stands or only ahead of the last stand, as may be desired.

From the above description and the accompanying drawing, it will be apparent that I have provided an integrated control system for a plurality of motors having a driving connection with a common load, such as a strip of metal in a tandem cold mill. By utilizing separate main generators for energizing the individual roll motors, a wide range of speed control may be obtained and an extremely flexible control system is provided. By utilizing tensiometer means for limiting the maximum tension obtainable in the strip, and utilizing control means for progressively increasing the slowdown of successive motors when the mill is slowed down, either together with the tensiometer means or as an alternative, breakage of the strip is greatly reduced and high speed production is greatly facilitated.

Since certain changes may be made in the above-described construction and different embodiments of the invention may be made without departing from the spirit and scope thereof, it is intended that all the matter contained in the descripion and shown in the accompanying drawing shall be considered as illustrative and not in a limiting sense.

I claim as my invention:

1. A drive for a tandem mill comprising, a plurality of motors arranged in driving relation with a continuous length of material, a separate main generator connected to supply electrical energy to each of the motors, and a regulating generator associated with each main generator controlling the output of said main generator in accordance with the speed of its associated motor and a common variable reference voltage.

2. A multiple motor drive comprising, a plurality of motors connected in driving relation with a common load, a separate main generator connected to supply electrical energy to each of the motors, a pilot generator individual to each motor operable to produce a voltage responsive to the speed of its associated motor, a master generator operable to produce a variable control voltage, and regulating means for controlling the output voltage of each of the main generators in accordance with the voltage of its associated pilot generator and the voltage of the master generator.

3. A control system for a plurality of motors having driving connection with a continuous strip of material comprising, a separate main generator connected to supply electrical energy to each of the motors, control means operable to produce a control voltage in accordance with the speed of each motor, a common source of variable control voltage, and a regulating generator associated with each of the main generators for controlling the output thereof, said regulating generators being responsive to the common control voltage and the speed responsive voltage of its respective control means in opposite senses.

4. A control system for a plurality of motors connected in driving relation with different roll stands of a tandem rolling mill comprising, a master generator for producing a common variable master reference voltage, a main generator associated with each of said motors for supplying electrical energy to said motor, a pilot generator associated with each of said motors for providing a control voltage proportional to the speed of said motor, and a regulating generator for controlling the output of each of the main generators, each of said regulating generators being responsive in opposite senses to the variable reference voltage and the output voltage of its associated pilot generator.

5. A control system for a motor having an armature connected to a source of electrical energy and a field winding comprising, a regulating generator connected to energize the field winding and having a plurality of field windings, circuit means energizing one of said field windings to provide a predetermined pattern field, additional circuit means connecting another of said field windings in circuit relation with the motor field winding in opposition to the pattern field, further circuit means connecting yet another of said field windings for energization in accordance with the armature current of the motor cumulatively with respect to the pattern field, and control means operable to vary the energizations of the pattern and cumulative field windings simultaneously.

6. In a control system for a motor having an armature and a field winding; a main generator supplying electrical energy to the armature; a pilot generator having a field winding energized from a source of control voltage and arranged in driving relation with the motor; a regulating generator connected to energize the motor field winding and having a plurality of field windings, one of said field windings being a pattern field winding energized from a source of control voltage, another being a speed regulating field winding energized in accordance with the armature current of the motor, and yet another being a differential field winding energized in accordance with the field current of the motor in opposed relation to said other two windings; control means operable to vary the energizations of the pattern, regulating and pilot generator field windings substantially simultaneously; and an additional regulating generator differentially responsive to a variable reference voltage and to the output of the pilot generator, said additional regulating generator being connected to control the output of the main generator.

7. A control system for a plurality of motors having field windings and armatures connected in driving relation with a continuous length of material comprising, a separate main generator for supplying electrical energy to the armature of each motor, said main generator having a main field winding and a regulating field winding, a master generator, control means varying the output of the master generator, a pilot generator associated with each motor for producing a voltage proportional to the speed of said motor, a regulating generator connected to energize the regulating winding, said regulating generator having a plurality of field windings including a speed regulating field winding energized in accordance with the armature current of its respective motor, and additional control means operatively connected to the control means for the master generator for varying the energization of the speed regulating field winding when the output of the master generator is varied.

8. In a control system for a plurality of motors arranged in driving relation with a common load, a separate main generator connected to supply electrical energy to each of the motors, circuit means operable to vary the supply of electrical energy to the motors collectively a regulating generator associated with each main generator normally operable to control the output of its main generator to maintain the motors in predetermined operating relation, and circuit means including control means responsive to the supply of electrical energy to its associated motor associated with one of the regulating generators connected to produce a control voltage for so varying the control of said regulating generator over its main generator from normal when the voltage applied to its associated motor drops below a predetermined value as to progressively vary one or the other of the plurality of motors from the predetermined operating relation.

9. A tandem mill drive comprising, a plurality of electric motors connected in driving relation with a strip of metal at spaced intervals, a separate main generator connected to supply electrical energy to each motor, control means for producing a common variable reference voltage, individual control means for producing a control voltage proportional to the speed of each of the motors, a regulating generator associated with each of the main generators and connected for normally controlling the output voltage thereof in accordance with the common reference voltage and the speed proportional voltage of its associated motor to maintain the motors in predetermined operating relation, control means associated with each of the regulating generators for varying the control thereof over its associated main generator in accordance with variations of said main generator output voltage below a predetermined level to vary the normal operating relations of the motors progressively.

10. In a control system for a plurality of motors having driving connection with a common load, circuit means normally operable to supply electrical energy to the motors under variable voltage conditions to maintain a predetermined operating relation therebetween, and control means associated with one of said motors operable to vary the speed of said motor relative to another of the motors when the voltage applied to said motor drops below a predetermined level.

11. In a control system for a plurality of motors having driving connection with a common length of material, variable voltage means connected to supply electrical energy to each of said motors, regulating means normally controlling the voltage applied to said motors in accordance with a common reference voltage and the individual speeds of the motors to normally maintain a predetermined operating relation therebetween, and asymmetric circuit means associated with each motor responsive to the differential between the voltage applied to its associated motor and a reference voltage for varying the control of the regulating means in predetermined relation when the voltage applied to said motor drops below a predetermined value.

12. In a control system for a reel motor connected in driving relation with a reel, a generator connected to supply electrical energy to the reel motor, a regulating generator normally operable to control the output voltage of the generator in accordance with the motor armature current, control means responsive in accordance with the diameter of the coil of material on the reel, an inertia compensation generator, and variable rheostat means controlled by the control means operable to produce a non-linear control voltage simulating the torque characteristic of the reel drive with reel diameter for controlling the output voltage of the inertia compensation generator.

13. In a control system for a reel motor for use with a reel, generator means connected to supply electrical energy to the reel motor, regulating means normally controlling the supply of electrical energy in accordance with a predetermined pattern and the load on the motor, control means responsive to the diameter of the coil on the reel, an inertia compensation generator connected to vary the control of the regulating means in opposite sense from normal during acceleration and deceleration, and additional control means operable in response to operation of said control means to provide a drooping and then a rising output curve for the inertia compensation generator conforming to the torque requirements of a reel drive with increasing reel diameter.

GLENN E. STOLTZ.

REFERENCES CITED

The following references are of record in the file of this patent:

UNITED STATES PATENTS

| Number | Name | Date |
|---|---|---|
| 2,315,869 | Montgomery | Apr. 6, 1943 |
| 2,320,833 | Shoults et al. | June 1, 1943 |